United States Patent [19]

McCauley

[11] Patent Number: 4,809,158

[45] Date of Patent: Feb. 28, 1989

[54] SORTING METHOD AND APPARATUS

[76] Inventor: Peter B. McCauley, 320 E. 25th St., New York, N.Y. 10010

[21] Appl. No.: 790,688

[22] Filed: Oct. 23, 1985

[51] Int. Cl.$^4$ ............................................. G06F 7/08
[52] U.S. Cl. ..................................... 364/200; 364/300
[58] Field of Search ... 209/900; 364/478, 900 MS File, 364/200 MS File, 300

[56] References Cited

U.S. PATENT DOCUMENTS

| | | | |
|---|---|---|---|
| 4,181,948 | 1/1980 | Jackson et al. | 364/478 |
| 4,295,206 | 10/1981 | Cain et al. | 364/900 |
| 4,358,016 | 11/1982 | Richardson et al. | 364/478 |
| 4,488,610 | 12/1984 | Yankloski | 209/900 |
| 4,570,221 | 2/1986 | Martens | 364/200 |
| 4,601,396 | 7/1986 | Pavie | 364/478 |
| 4,611,280 | 9/1986 | Linderman | 364/200 |

OTHER PUBLICATIONS

Aho et al., "The Design and Analysis of Computer Algorithms", Addison–Wesley Publishing Company (1974), pp. 76–97.

Software Tools in Pascal by Brian W. Kernighan and P. J. Plauger, Chapter, 4, pp. 109–125; date unknown.

Programming with FORTRAN by Seymour Lipschutz and Arthur Poe, Chapter 8, pp. 194–197 and pp. 162–163; 1978.

Primary Examiner—Joseph Ruggiero
Attorney, Agent, or Firm—Pennie & Edmonds

[57] ABSTRACT

A method is disclosed which provides for sorting computer data records in a minimum amount of time. Records are sorted according to their keys, typically from the most significant digit, or character to the least significant. The records are placed in or associated with various bins depending on the character on which the record is presently being sorted. These bins are linked together and appended to a front section when they are completely sorted. A first process in the present invention involves testing for equality between characters in adjacent records, and if equality does exist, not performing numerous otherwise necessary but tedious and time consuming procedures. A second process involves the use of an auxiliary or "bins used" table to identify the bins actually used in the current group of records. This auxiliary table is used to determine which bins to process if only a few bins are used. These two novel processes independently and in combination result in a reliably faster and more efficient sorting procedure than previously known, and may be applied to any type of bin type sorting procedure.

16 Claims, 7 Drawing Sheets

```
/* ================================================================== */
/* read sortin.dat (4chr text) to linked list, sort, write sortout.dat */
#include "stdio.h"
struct recrd { int rp; char ec; char sc[4]; }; static struct recrd sr[4001];
static int fpv[256], lpv[256], gpv[4], bcv[257], cp,dp,hp, cn,bn,kn, cx;
FILE *file1, *file2, *fopen();    static char cc,hc;

main() { datin(); if (cp != 0) { gpv[0]=-1;  dp=0;  kn=0;         /* ######## */
   do {                                                /* initialize for group */
       hc=0x0A;                                                   /* # 1 */
       cn=0;                                                      /* # 2 */
       cp=dp;

do {                                                   /* distribution */
           cp=sr[cp].rp;   cc=sr[cp].sc[kn];
           if (cc != hc) {                                        /* # 1 */
               hc=cc;                                             /* # 1 */
               if (lpv[cc] == 0) {
                   fpv[cc]=cp;
                   bcv[++cn]=cc;  }                               /* # 2 */
               else   sr[lpv[cc]].rp=cp; }
           lpv[cc]=cp;
       } while (sr[cp].ec == 0);

hp=sr[cp].rp;   cp=dp;                               /* reassembly */
       if (cn <= 24) {                                            /* # 2 */
           srtabl();                                              /* # 2 */
           for (cx=1; cx<=cn; cx++) { bn=bcv[cx];    relink(); }} /* # 2 */
       else {                                                     /* # 2 */
           for (bn=0; bn<256; bn++) { if (lpv[bn] != 0) relink(); }}
       sr[cp].rp=hp;

if (kn < 3) { gpv[kn+1]=hp;   cp=sr[dp].rp; }        /* "done" check */
           else { --kn;    finrtn(); }
       while (sr[cp].ec)   finrtn();
   } while (++kn); } datout();   printf("\n zipsort done.");   exit(0);  }       /* ######### */ relink() { sr[cp].rp=fpv[bn]; cp=lpv[bn]; lpv[bn]=0; sr[cp].ec=0x80; } finrtn() { dp=cp;  cp=sr[dp].rp;  while (cp == gpv[kn+1]) kn--;       } srtabl() { for (cx=2; cx<=cn; cx++)  { if (bcv[cx-1] > bcv[cx]) { bn=cx;
hc=bcv[bn];   do bcv[bn]=bcv[bn-1]; while(hc < bcv[--bn]);  bcv[bn+1]=hc; }}} datin() { hp=0; cp=1; file1=fopen("sortin.dat","r"); while ((cx=fgetc(file1))
!= EOF) { if (cx == 0x0A) { sr[hp].rp=cp; sr[hp].ec=0; hp=cp++; cn=0; } else
sr[cp].sc[cn++]=cx; } cn=fclose(file1); sr[--cp].rp=0; sr[cp].ec=0x80;  } datout() { file2=fopen("sortout.dat","w"); cp=sr[0].rp; cn=0; while (cp != 0)
 { cc=sr[cp].sc[cn++];  fputc(cc,file2);  if (cn == 4) { fputc(0x0A,file2);
cp=sr[cp].rp;  cn=0; }} fputc(0x1A,file2);  cn=fclose(file2);           }

/*     End of sort. For clarity, the i/p is up to 4,000 lines of 4 text
   characters each. The end-of-group flag bits are set into their own
   character in each record, instead of being a bit within the pointers.

The main routine is between the "##"'s, with variable definitions above
   and subroutines below. Starting a group, hc is made <> the first char. */
/* ================================================================== */
```

Fig. 7

TIME TO COMPLETELY SORT N RECORDS (IN 1/100 SEC.)

| N = NUMBER OF RECORDS | WITH FIRST PROCESS | | WITHOUT FIRST PROCESS | | WITHOUT 1ST/ WITH 1ST | |
|---|---|---|---|---|---|---|
| | 256V | 1V | 256V | 1V | 256V | 1V |
| 40,000 | 6147 | 2911 | 5794 | 4845 | 0.94 | 1.66 |
| 20,000 | 3087 | 1461 | 2933 | 2427 | 0.95 | 1.66 |
| 10,000 | 1741 | 736 | 1670 | 1214 | 0.96 | 1.65 |

NOTE: EACH RECORD IS SORTED ACCORDING TO ITS 4 CHARACTER KEY. '256V' SIGNIFIES THAT THE DATA USED IS 256 RANDOM CHARACTERS WHILE '1V' SIGNIFIES THAT THE FIRST CHARACTERS OF ALL KEYS ARE EQUAL, THE SECOND ARE EQUAL, THE THIRD ARE EQUAL, AND THE FOURTH ARE EQUAL.

SORTING METHOD AND APPARATUS

BACKGROUND OF THE INVENTION

Sorting is generally acknowledged to be one of the most time consuming procedures for which computers are used. The amount of work recently published in this area clearly indicates the importance of efficient sorting techniques. Knuth, in *The Art of Computer Programming*, Vol. 3, p. 3, Addison-Wesley Publishing Co., 1973, stated that computer manufacturers estimate over twenty-five percent of all computer running time was then being spent on sorting. It is believed that the figure is at least as high, and probably higher, today. Many installations utilize more than half of their computing time on sorting. Rearranging data within a computer is essentially a tedious task performed by numerous complicated and often inefficient steps.

In order to reduce the amount of time spent on sorting, numerous proposals and improvements have been set forth in the prior art. These prior art procedures, which sort a group of N data records in a main file into a specified sequence, as determined by an identifying key assigned to each record, generally fall into one of three categories based on the time to sort N records. However, a procedure most efficient for a certain number of records is often inefficient and unnecessarily time consuming for a different number of records. In the first category, the sort time, or time to sort a file of N records, is approximately equal to $O_s N^2$, where $O_s$ is a constant. This type of sort, including insertion, selection, and bubble sorts, is generally the simplest type and is most efficient for relatively small N, for example, 10 or less. Although other sorting procedures are more efficient for N larger than 10, say between 10 and 100, the overall time to sort this moderately small file is generally so insignificant as not to warrant the use of a more complex procedure within that range of N.

In the second category of sorting procedures, the sort time is approximately equal to $O_m N \log_2(N)$, where $O_m$ is a constant larger than $O_s$. This category includes Quicksort and Heapsort and is generally the most efficient type of sort for N between 10 and 100,000 records. Quicksort is a standard internal computer sort and is generally regarded as the best all purpose sort, however, its efficiency can decrease dramatically for non-random data records. A presorted file may be the worst case for Quicksort, where the sort time may be proportional to $N^2$.

The third category of sorting procedures has a sort time approximately equal to $O_l N$, where $O_l$ is a constant larger than $O_m$. This category generally includes all types of bin sorting, such as radix sorting, and is generally the most efficient sort for over 100,000 records. Bin sorting typically starts by sorting the data records according to either the least significant digit (LSD) or the most significant digit (MSD), of the key, and places each key into a bin corresponding to the character value. In a LSD type bin sort, after all the keys have been sorted on the first LSD, they are then sorted on the next higher digit, taking care not to disturb the then-existing order among the keys. This process is repeated until the MSD is sorted, at which point the keys will be completely sorted. The LSD method requires that each key will be processed a number of times equal to the number of digits in the key, since it starts at the last (i.e., "least significant") digit, and cannot be finished until the most significant digit has been processed. This is an economical method when the keys are short relative to the number of records in the file because under those conditions all the digits in most of the keys will be used at least once regardless of the sorting method employed.

In an MSD type bin sort, however, after all the keys have been sorted on the first MSD, the procedure distinguishes between the keys in the separate bins and sorts the keys in the first bin according to the second MSD. This process continues until all keys from the first bin have been completely sorted, at which point sorting will continue with the second MSD on the keys from the second bin. After all the keys which were in the second bin have been completely sorted, the sorting will continue with the second MSD on the keys from the third bin, and so forth, until all the keys are completely sorted. By treating separately the groups of keys which have already been distinguished on their most-significant-digits, the MSD method has an advantage over the LSD method when the least significant part of the keys is not needed to order the records, as is frequently the case. Thus, the MSD method has an expected time of $O_m N \log_2 N$, and a worst case time of $O_l N$.

All known sorting procedures perform ineffective and time consuming steps some of the time. Prior sorting procedures perform a process of ordering keys even when it is not necessary to do so, resulting in excessive time spent on sorting. Prior art methods also tend to become very inefficient for those parts of a sort in which the number of actual characters to be sorted in a given iteration is much smaller than the maximum number of characters possible (which corresponds to the number of available bins). In both cases, processing steps and therefore time are unnecessarily spent. In addition, many prior sorting procedures can only sort in an ascending or descending order and are not capable of dealing efficiently with the internal representation of numbers such as negative or exponential numbers or other unusual lexicographic sequences. For example, they may not efficiently do alphabetic sorts in which the lower and upper case appearances of the same letter are to be grouped together, or handle numerical sorts where the absolute value of the numbers are to be sorted on, Because of the importance of sort procedures, the art has always sought more efficient and reliably faster sorting methods. Moreover, there is a need for a new versatile sorting procedure which is more efficient and faster prior art sorting procedures over a much larger range of N. It is an object of the present invention to provide a sorting method in which significantly increased time is not required to sort each item due to a pre-existing order among the items (i.e. a departure from pure randomness) as is the case with Quicksort and other comparable sorts, or the nature of the information associated with each key, or changes in the total number of items N. It is a further object of the invention to provide a sort method in which the time needed to sort each record decreases significantly when the items are originally partly pre-sorted. Stability is also an object of the present invention, i.e., to retain the original order of any two adjacent records, during the sort, when comparison of their corresponding keys show them to be equal. A further object of the present invention is to provide a sorting method in which only a moderate amount of working space or memory is required and the sorting procedure is comprised of a minimum number of steps. A still further object is to provide a sorting method having the ability to deal efficiently with the internal representation of numbers or other unusual lexicographic sequences, and variable length records and keys.

SUMMARY OF THE INVENTION

According to the present invention, data sorting is achieved by use of a bin sort method. In a bin sort, to sort e.g., a large group of books according to author in alphabetical order, one could place each book into a bin according to the first letter of the author's name. The books from the "A" bin could then be sorted again on the second letter of the authors' names, and so on until they were fully ordered and placed in a "done" area. Subsequently, the books from the "B" bin would be put into final order and placed in the "done" area, appended to the sorted "A" books. This process would continue, taking books from successive bins, ordering that subgroup, and appending it to the "done" group, until the entire collection was sorted. This would be an MSD bin sort, as will be explained; the invention is also applicable to non-MSD bin sorts.

It has been discovered that substantial efficiency can be gained by providing a bin sort in which steps are incorporated to take advantage of the existence of equal corresponding characters in adjacent keys and to refrain from ordering the keys in the event of such equality. It has also been discovered that substantial efficiency can be gained by keeping track of the number of bins or character values actually used, comparing this to the total available number of bins, and determining on the basis of this ratio whether to process only those bins actually used, which are also kept track of.

Based upon these discoveries, the present invention is more efficient and faster than previously known methods, including the Quicksort method with known improvements as set forth in Robert Sedgewick's article *Implementing Quicksort Programs*, Communications of the ACM, October 1978, Vol. 21, No. 10., and other general purpose sorts used in most computers. The present invention has an efficiency which for all practical purposes surpasses that of all known sorting procedures for even moderate N. The only exceptions, which are of little commercial significance, are where N is less than about 10 or greater than about $10^6$, depending on the size of the key. The procedure, in accordance with the invention, is capable of rearranging data into any desired sequence. Advantageously, the present invention is applicable to essentially all types of bin sorting procedures, whether the keys are sorted from the MSD to the LSD, or from the LSD to the MSD, including those which do not use pointers, such as distribution counting.

The present invention does not generally significantly increase the time to sort each item due to a preexisting ordering of the items, or the nature of the information associated with each key, or the number of items. In a preferred embodiment of the invention, each record to be recognized and sorted by the system is read into the system in a manner such that each record has data associated with a key, and a pointer - associated with the key. The function of the pointer is to define the sequence in which the records are placed. The records themselves are not moved, rather the pointer values are changed to point to different records, thus effectively altering their order. This use of pointers results in greatly reduced data movement, a corresponding decrease in sort time and also simplifies the sorting of records and/or keys of unequal length.

In the main file to be sorted, we define conceptually for purposes of explanation two sections of constantly varying length, a "front" section which is completely sorted, and a "back" section which is at most partially sorted. Initially, the front section is empty and the back section is not sorted at all. The procedure sorts from the front section to the back section. Each record (except the last) in the front section points to a next record somewhere in the front section so that by accessing the records in the sequence indicated by simply following the pointers, the records in the front section are completely sorted. As sub-groups of the back section are completely sorted they are appended onto the front section by having the pointer of the last completely sorted "done" record point to the first record of the just sorted sub-group, which may contain a single item.

In a preferred embodiment of the invention which involves sorting on the MSD first, after the first record pass, or sort on the first character, all records with keys having a first character "A" will have been placed in, or associated with, the "A" bin, all records with keys having a first character "B" will have been placed in the "B" bin, etc. When this process of distribution is completed, the file is reassembled by linking the "B" bin onto the end of the "A" bin, the "C" bin onto the end of the "B" bin, etc. When this process of reassembly is complete, the entire file will have been sorted on the first character of the key.

Subsequently, the second key character of a subgroup from the file composed of only those records with keys beginning with "A" is processed in an identical manner, reusing the presently empty bins. All records beginning with "A" have now been distributed for a second time, and the "A" bin will contain all and only those records with keys beginning with "AA", the "B" bin will contain all and only those records with keys beginning with "AB", etc. These binned records are then reassembled again within the main file, just in front of the partially sorted records beginning with "B". At this point, the group of records with keys beginning with "A" are sorted on the first two characters of their keys, while the latter items in the main file are sorted only on the first character of their keys.

The third key character of a sub-group from the "A" group composed of only those items with keys beginning with "AA" is then processed in exactly the same way, re-using the presently empty bins.

This process continues until either the first item in the unsorted section of the file is a singleton, i.e. it would be in a sub-group of only one item, which will then be appended to the completely sorted front section of the file, or the key is exhausted, in which case the entire sub-group just processed is completely sorted and may then be appended to the front section.

In accordance with the invention, steps are provided to determine, during each iteration, or record-pass of a sub-group, when adjacent keys have equal corresponding sort characters, and to avoid the step of ordering such keys if that is the case. For example, let the first key be AQR and the second key be ABE, and let us sort according to the first character, i.e. the first record-pass through the group of keys. Since the first characters of the two keys are equal, and since only these first characters are presently being processed, the pointer value of the first record does not have to be changed. Rather than unnecessarily adjusting the pointer we may continue to permit the first record to point to the second record. Although the proper sort would still result by performing the unnecessary step of adjusting the pointers, it is inefficient.

Also in accordance with the invention, there are provided steps to efficiently deal with and take advantage of the situation where the number of characters actually encountered in an iteration (i.e. in the record-pass for a group currently being sorted) is substantially smaller than the possible, or allowable, number of characters, that is, when a substantial fraction of the bins have not been used at all. For instance, in the previously mentioned example of sorting books by author, each character or letter of the author's name can be represented by a byte, thus $2^8$ 32 256 bins are possible although only 26 are necessary for alphabetical characters. Therefore, in accordance with the present invention, there is provided a "bins-in-use" table which is a constantly updated list of the bins which have been used so far in the present record-pass. If more than a certain threshold number of bins are used, the "bins-in-use" table is disregarded and sorting proceeds as in conventional sorts. However, if the number of bins used is less than a certain threshold number, efficiency is enhanced by sorting this relatively small "bins-in-use" table directly to obtain a sorted subgroup, rather than checking all possible bins to determine which bins were actually used.

The first described procedure for testing for equality of corresponding characters in adjacent keys, and the second described procedure which employs an auxiliary, or "bins-in-use" table, may be used together or singly in accordance with the invention. The effect of using either one, or both, of such procedures will vary depending on the nature of the input data, the particular programming language and the hardware employed. For some sets of data, for example, as a practical matter, it would not be advisable to use either procedure separately but it may be highly advisable to use both together in accordance with the invention.

BRIEF DESCRIPTION OF THE DRAWINGS

These and other objects, features, and advantages of the invention will become more readily apparent with reference to the following description of preferred embodiments of the invention in which:

FIG. 6 is one implementation of the flowchart of FIG. 1.

DETAILED DESCRIPTION OF THE INVENTION

A preferred embodiment of the present invention, illustrated with reference to the flowchart of FIG. 1, requires that each data record to be recognized and sorted by the system be read into the system (1) in a manner such that each record has data associated with a key, and a pointer to locate the next record's key. Files which originally do not have such pointers may be sorted in accordance with this embodiment of the present invention by adding pointers to the records as they are read into the system. Then the records themselves need not be moved, rather, the pointer values are changed to point to different records, thus effectively sorting the records into a desired order. Such a structure of records and pointers, known as a "singly linked list", is particularly well suited to procedures which move through a file or group of records from front to back.

The first/next (depending on whether the sorting procedure has just started) character of the keys is then set to be the "sort character" for the current pass through the current group of records, and the "current pointer" is set to point to the first record in that group (2). The records in that group are then distributed among the bins according to the value of each record's sort character (3). After all the records in that group have been distributed, they are reassembled by relinking the lists in the bins back together in ascending bin number order (20). The leading records in that group are then checked and, if they are completely sorted, appended to the "done" group at the front of the file, and not examined again during the sort procedure (45). After that check is performed, a determination is made (46) to see if any records are left that have not been completely sorted. If such records do exist, the system proceeds to sort the next group (i.e., the leading group of records in the not completely sorted section of the file) of records (47,2). When there are no more records to be sorted the sort is all done, and the records may be moved out of the system in the desired sort sequence (49).

Because each record points to a next record, by maintaining a pointer to the first record of a list that entire list is available to the system by using the pointer in the current record to access the next record (making that the "current record" ) repeatedly. Some separate vectors (i.e., single column arrays), and variables are employed to keep track of the beginning and end of lists, and the current and next records. Each "bin" is comprised of pointers kept in two vectors, the "first pointers vector" ("FPV"), and the "last pointers vector" ("LPV"). The FPV holds for each bin a pointer to the first record of the sub-list associated with that bin, if there is one. The record pointers can always be followed to get to any other records in a sub-list, so there is no need to keep all the individual pointers in the bins. The LPV facilitates adding records to the bins during the distribution procedure, and relinking the sub-lists back together during the reassembly procedure (without the LPV, each entire sub-list would need to be traversed to find the last record in that sub-list to link the next record to.) The "current pointer" ("CP") is a variable (i.e., not an array) which points to the specific record being processed at a given time. The "done pointer" variable ("DP") points to the last "done" (i.e., completely sorted) record. The "binned characters vector" ("BCV") is an auxiliary table which keeps track of the bins-in-use for the current group of records.

Figure 2A:
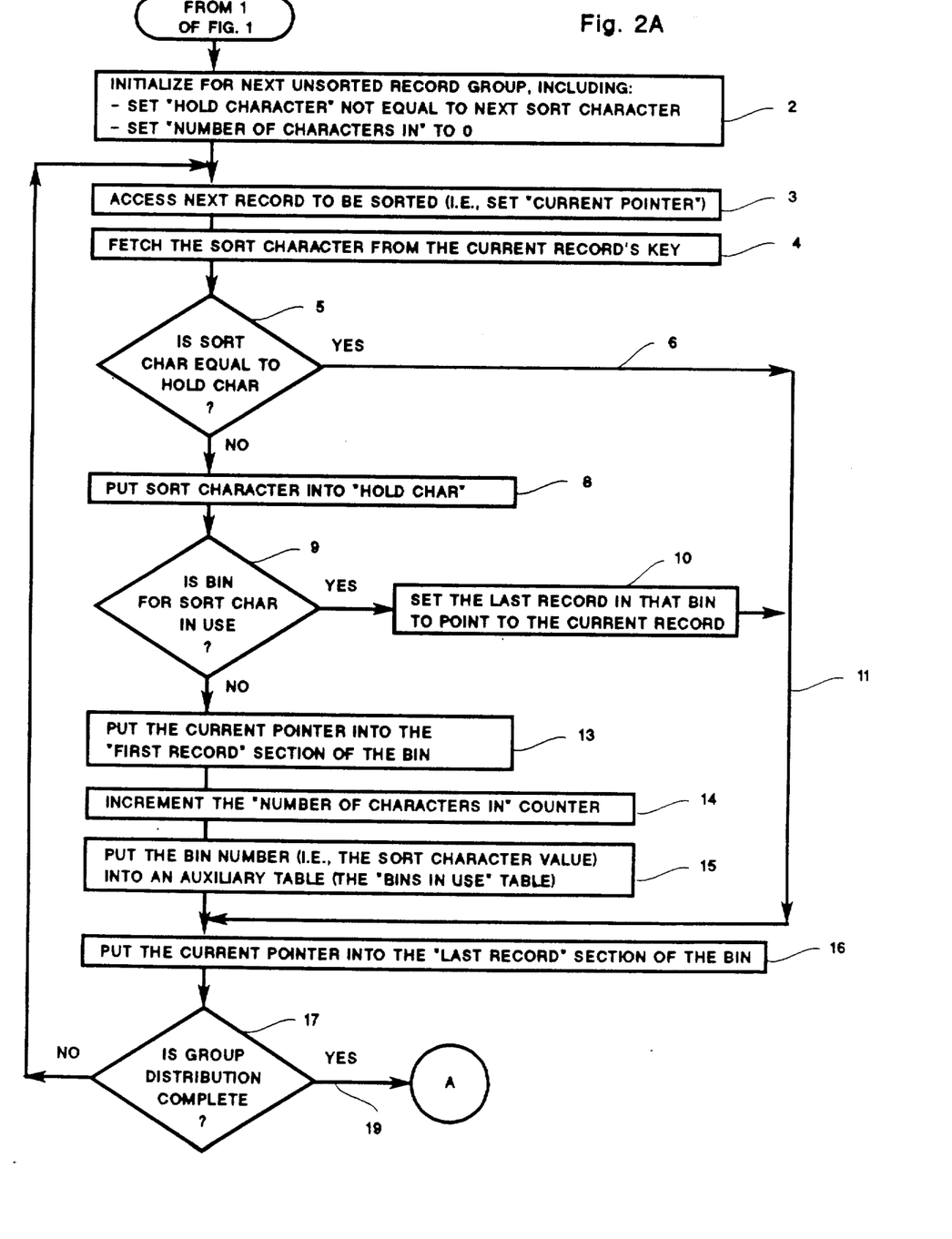
FIG. 2a, FIG. 2b and FIG. 3 are flowcharts depicting certain processes of the present invention in greater detail.

For a more detailed explanation of the distribution part of the sort procedure, reference is now made to FIG. 2a. Prior to commencement of the actual sorting procedure, the system has been initialized by reading in all the data records to be sorted, establishing the pointers in each record to the next record, and setting the LPV vector to zero (or "nil"). A dummy sentinel record, the "head", is set to point to the first data record. The last data record in the entire file has its "end-of-group" flag set to indicate that it is the end of the current group of records and its record pointer is set to point back to the "head" record. Thus, a convenient form for the file is a circle, but the "head" is a special empty record with a fixed position which just points to the first data record. Sorting has not begun, so the "done" group at the front of the file is empty, and the "done pointer" is set to point to the dummy "head" record.

During initialization for the first (or next) group of records to be sorted (2), a "hold character" ("HC") is set so that it will be not equal to the first sort character which will be encountered in that distribution pass, and the "number of characters in" counter ("CN") is set to zero. Each sort character of an iteration resides in the same relative position of the key, i.e., if we are sorting G keys on the second character in a record-pass, each of the group of G sort characters will be in the second most significant position in each of the G keys. The "key character number" ("KN") which specifies which character of the key is being sorted during the current pass is set to access the appropriate character in the key.

The first (or next) record to be sorted is then accessed, by setting the "current pointer" to point to it (3). The sort character indicated by the "key character number" is then fetched from the key of that record and held as the "current character" ("CC") (4). If the sort character is not equal to the "hold character" (5,8) then the "hold character" is set to be the current sort character (8) (i.e., set up for the corresponding test on the next key). It must then be determined whether the bin corresponding to that character is in use or empty (9). It is convenient to use the LPV section of the bin for that purpose. If the LPV value is not zero, the corresponding bin is not empty. If the bin is not empty then the current record is added to those already in that bin by appending the current record to the last record in that bin (10). This is accomplished by putting the current pointer into the record pointer section of that last record in that bin, so making the previous last record in that bin point to the current record. The processing for the current record's sort character is completed by placing the current pointer into the "last record" section of the bin (16).

If the bin is empty, a different procedure is followed (9,13). The current pointer is placed in the FPV vector location corresponding to that bin (13), since this is the first record to go into that bin during the current iteration. The "number of characters in" counter ("CN") is then incremented (14), and the current sort character is put into the "CN"th spot in the "binned character vector" (or "bins-in-use" auxiliary table, "BCV") (15). Thus, the first sort character encountered during the distribution of a group will always be put into the first spot in the auxiliary table, the next character different from that one, if there are any in that group, into the second spot of the auxiliary table, and so forth.

In accordance with a preferred embodiment of the present invention, if the current sort character is equal to the corresponding sort character of the preceding key (5,6), the above procedures (8–15) are omitted entirely and the sort proceeds to place the current pointer into the "last record" section of the bin (16). Although a properly sorted file will result by performing those omitted procedures even when the current and preceding sort characters are identical, as is conventionally done, omitting them in accordance with the invention has been found to save a significant amount of time when such adjacent equality is not rare. Regardless of whether the current sort character was identical to the preceding sort character, or whether the bin corresponding to the current sort character was empty or was already in use, we must now update vector LPV, the "last record in" portion of the current bin, by putting the "current pointer" into it (16). After this is done, if this was the first and therefore only record to go into that bin at this point in the current iteration, then FPV and LPV for that character will be identical, i.e., they both will contain the "current pointer". However, if more than one record for a bin has been encountered during the current iteration, then FPV and LPV for that bin will be different, for "FPV [bin]" will point to the first record which went into that bin and "LPV [bin]" will point to the last record which went into that bin. For example, if the system had just sorted on the second character of the keys BRO, BRV, BRK, BRQ, and BRD, then the vector FPV (at character R) will contain the pointer to record BRO, while vector LPV (at character R) will contain the pointer to record BRD.

At this point, the distribution of the current record into its appropriate bin is complete, and we must decide whether we are finished with the current group of records (17). The current group of records is finished when the last key in that group has been sorted (i.e., distributed) according to the current sort character from the key If we are not finished, as would be the case if we are sorting by the third character and have reached the tenth key of a twenty key group to be sorted with respect to that character, then we must return to access the next unsorted record (17, 3) and perform the above procedures again. If the distribution of the current group of records is finished, (17,19) the reassembly procedure begins (20).

Figure 1:
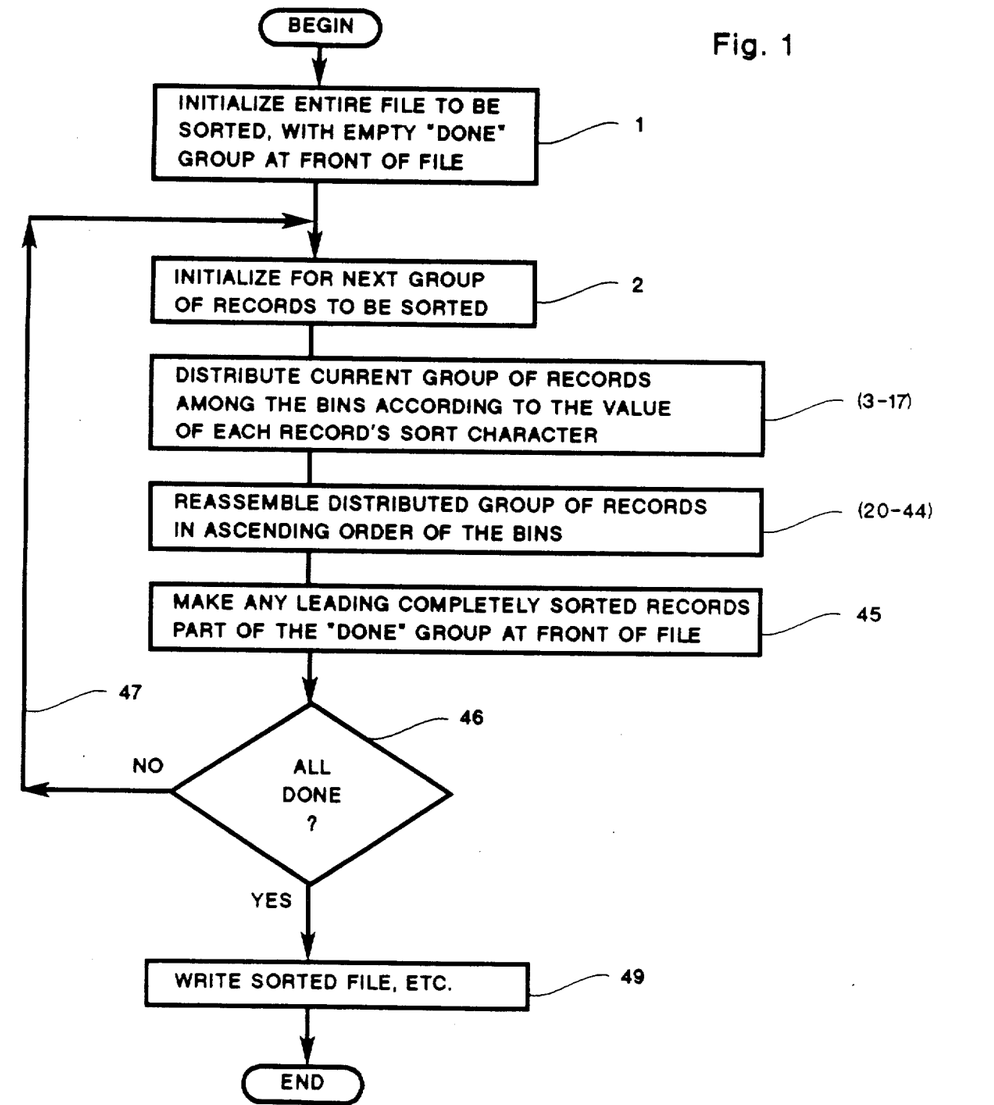
FIG. 1 is a flowchart depicting a broad overview of the sort procedure.
Figure 2B:
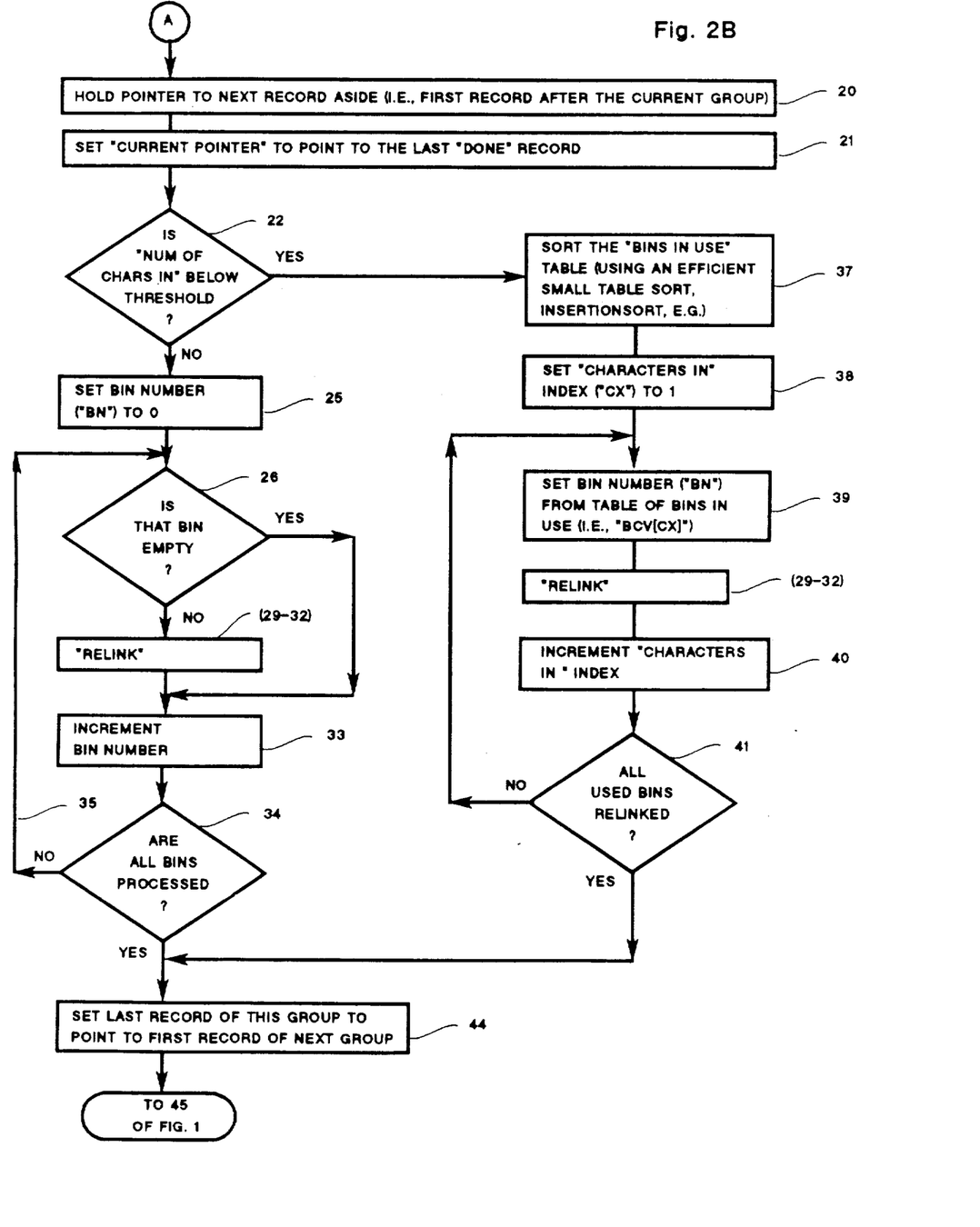

Referring now to FIG. 2b, the reassembly procedure is shown in greater detail than in FIG. 1. Before reassembly actually begins, the pointer to the next unsorted record, (i.e., the record pointed to by the last record of the current group, which will be the first record in the following group of records), is held aside (in "HP") for later use (20). Then the "current pointer" is set to the last "done" record (21), which is at the end of the completely sorted section.

A determination is then made whether the number ("CN") of different characters encountered during the most recent distribution procedure exceeds a threshold level (22). This threshold level is a fraction of the number of possible different characters (i.e., the number of bins available), established by experiment to determine when it will be most efficient to (a) examine all bins and relink the contents of those containing pointers (22,25), or (b) examine the characters in the bins-in-use auxiliary table and relink only the contents of the bins identified in the auxiliary table, without any examination of the remaining bins (22,37). If CN is greater than the threshold level, then all the bins will be examined (22,25). A bin index (or "bin number", "BN") is set to zero (25). The bin index is employed to reference the individual bins, e.g., a "bin number" of zero corresponds to, or addresses, FPV(0) and LPV(0), which collectively comprise the zeroth bin. The vector LPV is checked to see if its corresponding component ("LPV [bin]") has the value zero (26), which would signify that the particular character corresponding to that bin was not encountered during the most recent distribution of a group of record (i.e., that the bin was empty). When a non-zero value is encountered, the beginning of the sub-list of records in that bin is linked to the end of the preceding list, the end of that sub-list is held to be linked to the next bin's sub-list, and the LPV component is reset to zero (29-32). If the bin is empty, the relinking procedure is not performed. Regardless of whether the bin is empty or in use, the bin index is incremented (33) and tested to see if all the bins have been checked and those in use relinked (34). If more bins remain to be checked, (34,35) then the procedure is repeated, starting with the bin check (26).

In accordance with a preferred embodiment of the present invention, when it is determined that the number of different characters in ("CN") encountered during the most recent pass through the current group of records does not exceed a threshold level (22,37), then relinking will be performed for the bins actually used without checking the bins that were not used. As noted above, if CN exceeds a threshold level then all possible bins are checked (25,26,33,34), even though only the bins-in-use have any records to be relinked (29-32). When the "number of different characters in" is not greater than the threshold level, however, the auxiliary "bin-in-use" table is employed to identify which bins have records to be relinked, and therefore it is not necessary to check for bins not used during the most recent distribution of records.

The threshold level for this purpose is a function of the particular software and hardware used, and the number of possible different characters. Levels of approximately eight to approximately sixty-four have been found advantageous for a number of bins equal to b 256, with 24 generally a good level. The primary trade-off is between the time required to sort the auxiliary table and use the sorted auxiliary table to indirectly locate the bins-in-use, versus the likelihood of wasting the time required to directly check bins which happen to be empty.

Before the auxiliary table can be used to identify the next bin to be relinked, it must be sorted (37), since the character values (or "bin numbers") it contains are in the order of their first occurrence during the most recent distribution pass. This will usually be a random order and not the desired sequence for the sort. Sorting of the auxiliary table may be done by any of the known procedures which are reasonably efficient for small tables, such as "Insertion sort". The result of the sort of the auxiliary table is that the lowest of the character values actually encountered during the most recent distribution pass will be in the first spot in the auxiliary table, the next higher character value encountered will be in the second spot, and so forth. A character value index ("CX"), is initialized to one (38), so as to address the lowest character value in the auxiliary table. The "bin number" index ("BN") is then set to the character value located by the character value index (39), and the standard relinking process is performed using the "bin number" to locate the bin to be relinked, as usual; (29-32) The "character value index" is then incremented (40), and tested to determine whether all the character values encountered during the most recent distribution pass have already been processed (i.e., whether all the distributed records have been relinked) (41). If more records remain to be relinked then the "bin number" is set to locate the next sub-list of records (41, 39), and the procedure is repeated.

Regardless of whether all the bins are checked, or whether the auxiliary table is used to determine which bins have records to be relinked, when all of the records most recently distributed among the bins have been relinked in sort order (on whichever character of the key was being sorted) to the front section of the file, then the last record of that group is set to point to the first record in the following group (44). Then the entire file is all together as a single list again, and the most recent group of records to be distributed and reassembled has been sorted on another character of their keys.

Referring now to FIG. 1 again, at this point an "end" routine which determines what the sort procedure will do next is performed (45). This may be done in a variety of ways, e.g., by keeping and checking counts, and/or by setting and checking flags, and/or by stacking and checking pointers. The most convenient and efficient approach or combination of approaches in a particular instance depends on the hardware and language used. By whatever approach, three tasks are performed: (a) determine which, if any, of the leading records in the back (i.e., immediately after the "done" pointer) portion of the file are now sorted (or have no more unsorted characters in their sort keys), and adjust the "done" pointer rearwards in the file accordingly; and (b) determine whether any records remain to be sorted; and () determine which position in the sort keys will be the sort character during the ensuing distribution pass. If some records remain to be sorted, the procedure returns to complete the initializations for the next group of records (46,2), and repeats. If there are no more records to be sorted, then the desired procedures for the sorted file may begin, e.g., writing the records out in completely sorted order (49).

Records become completely sorted, and therefore appended to the "done" section at the front of the file, in one of two ways. Either the key has been exhausted for a group of records, or the first record in the unsorted section of the file is a singleton. In the former case, the entire group just sorted is as sorted as it can get, so that whole group becomes part of the "done" section. A singleton is a record in a group of only one item. For example, for keys ABCDE, ABCDF, ABCDA, ABCDAQZ, ABCDRM, ABCBDA, and ABCDP, the sixth key ("ABCBDA") would be a singleton at the front of that group if we had just sorted on the fourth character of the key. It is not necessary to sort on any more key characters of a leading singleton, it is completely sorted and may therefore immediately become part of the "done" section at the front of the file.

Figure 3:
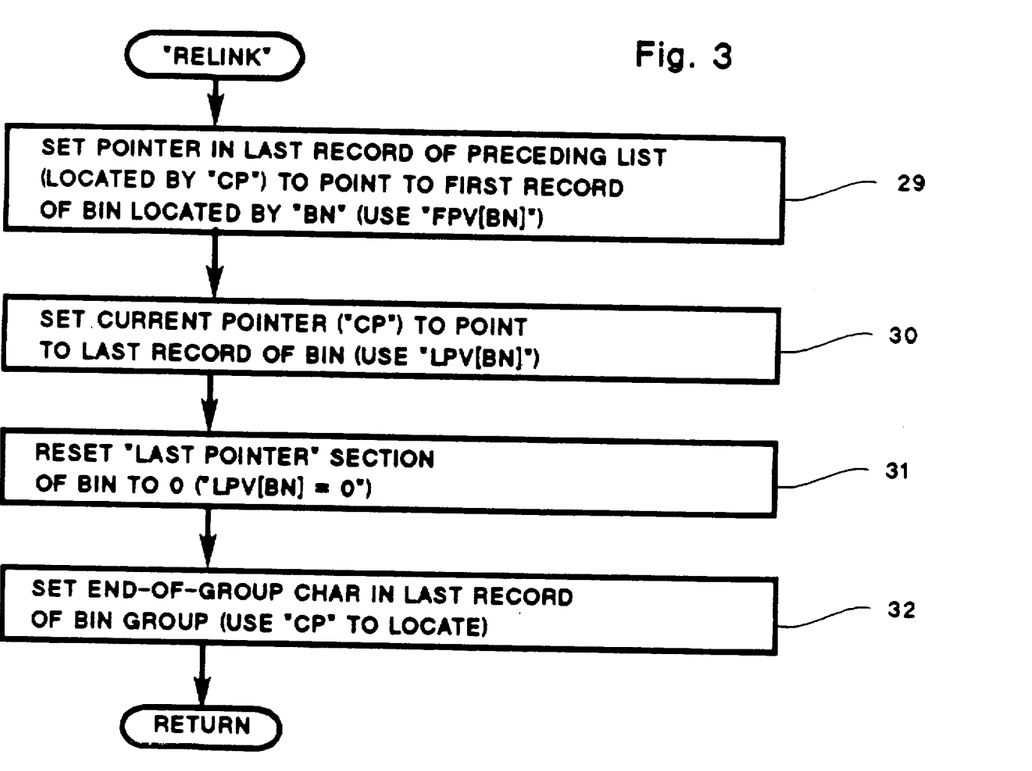

Referring now to FIG. 3, the "relink" process is depicted in greater detail. Before that procedure begins, the "current pointer" ("CP") has been set by the system to point to the last record of the preceding list, i.e., the list to which the list being relinked is to be appended; and the "bin number" ("BN") has been set to locate the bin of records to be relinked. Recall that because all the records in a specific bin are set to be in a simple, distinct list during the distribution process, the bin itself just holds pointers to the first and last records of that list (in vectors "FPV" and "LPV"). That is, the bins do not need to hold all the pointers to the records in each bin, for it is economically sufficient that the system be able to locate immediately only the first and last records in each bin. The first operation in relinking is to put the pointer to the beginning of the sub-list of records in the bin located by the "bin number" ("FPV [BN]") into the "record pointer" section of the record pointed to by the "current pointer" (29). Thus, the last record of the preceding group now points to first record of the list being relinked. The "current pointer" may then be set to be the pointer to the last record of the list being relinked (30). Thus, the "current pointer" is prepared for the next relinking process. The "last pointer" section of the bin ("LPV [BN]") can now be reset to zero, which is how the system detects an empty bin (31). Finally, an end-of-group flag may be set in the record pointed to by the "current pointer", for it is the last record of a distinct group of records (32). If the group happens to be completely sorted, then that flag may not be useful, but it is generally simpler and more efficient to set the flag and never use it rather than have separate procedures for the two possibilities. At this point, relinking of a specific bin is complete, and the "current pointer" is ready for the current list to be linked to the next list.

The above discussion and FIG. 1 relate to an MSD listed radix sort incorporating the present invention. The procedure set forth in FIGS. 2a and 2b with steps 5, 8, 14, 15, 22, 37, 38, 39, 40 and 41, and the related initializations in step 2 removed, would be an unimproved MSD listed radix sort.

The above depicted embodiment of the invention was designed with a first priority of clarity and a second priority of efficiency. Efficiency frequently can be improved at the expense of somewhat longer, perhaps more complicated procedures. Short subroutines can replace their calls in the main procedure, for example, and thereby speed up the procedure by eliminating the subroutine starting and ending processes. Another known technique is to use special set-up and wind-down procedures in order to eliminate some processing within a repeated central procedure. Additionally, most modern computers have a small, very high speed memory, and a large, slower (by a factor of approximately 5) main memory. Some computer languages take better advantage of such hardware characteristics than do others. Procedures which minimize the number of operations actually performed and the use of relatively slow main computer memory can be significantly faster than other procedures which perform the same function.

With reference to FIG. 6, routines "relink", "finrtn" and "srtabl" are short subroutines used by the main procedure "main". In another embodiment of the invention, efficiency will be increased by about twenty percent by copying those procedures into the positions they are called from in the main procedure, and eliminating the associated subroutine calls.

In many applications the records to be sorted will not already be set up in memory, but will be read in from some external device such as tape or a disk. In another embodiment of the invention, the distribution of the first sort character can be combined with reading in the records, thus saving one pass over the entire file of records. Other operations such a data conversions may also be conveniently performed during such a procedure.

The first process discussed above with reference to steps numbered 5,8 skips certain operations (8-15) when adjacent sort characters are equal. In another embodiment of the invention, updating the "last record" section of the bin (16) can be deferred until the sort characters are different or the sub-group is finished. In applications where the previous pointer can be efficiently held aside, such deferral can increase efficiency of processing large numbers of equal adjacent sort characters by approximately thirty percent.

The second process discussed above with reference to steps numbered 14, 15, 22 and 37–41 involves the use of an auxiliary table to identify the bins used in the present record-pass, where each different character in the present record-pass is placed into an auxiliary table which is then sorted and used to determine which bins to process if only a few bins are used. In another embodiment of the invention, efficiency can be increased if, upon reaching the auxiliary table threshold level, the auxiliary table is not updated during the remainder of the current iteration. This latter embodiment would be advantageous if the "binned characters" were being sorted as they were put into the "bins used" table. In an alternative embodiment of the invention, a table of bits could be used to determine the bins to be processed, where each bit represents a character value. For example, for the 256 possible character values of an 8 bit key, only 16 16-bit words would be required and therefore only 16 memory fetches, not 256, and no sorting of an auxiliary table. This method is generally more efficient in an assembly language implementation of the present invention. In general, which of the two methods will be best for a specific application will depend on the machine characteristics including the number of registers, the speed of the registers as opposed to memory operations, the assembler instruction set, and language characteristics.

Figure 4:
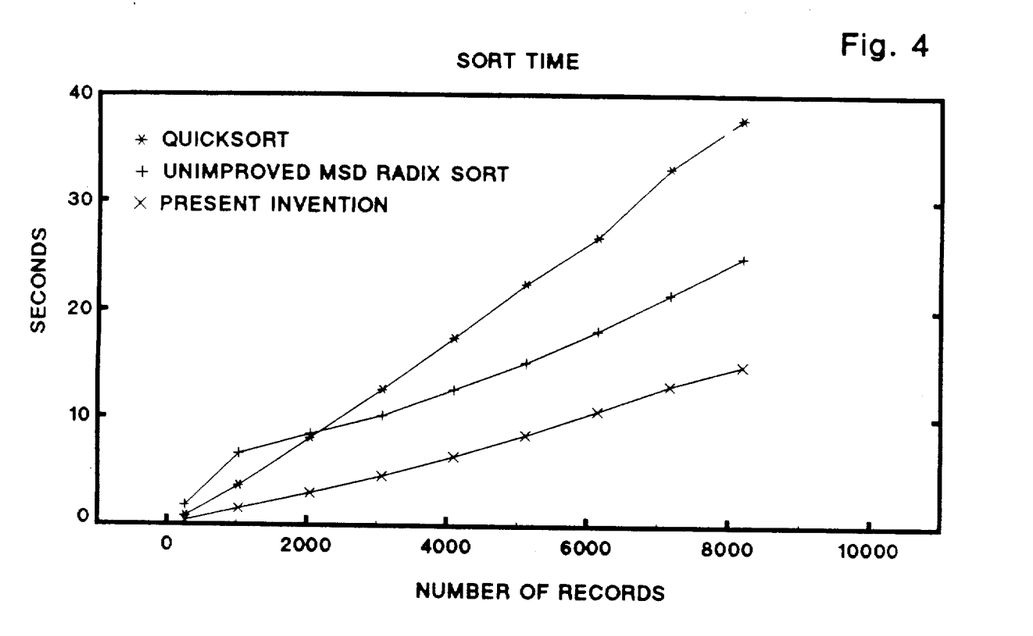
FIG. 4 is a graphical representation of the number of records to be sorted versus the sort time, for Quicksort, the present invention and an unimproved MSD listed radix sort, for a moderate number of records.
Figure 5:
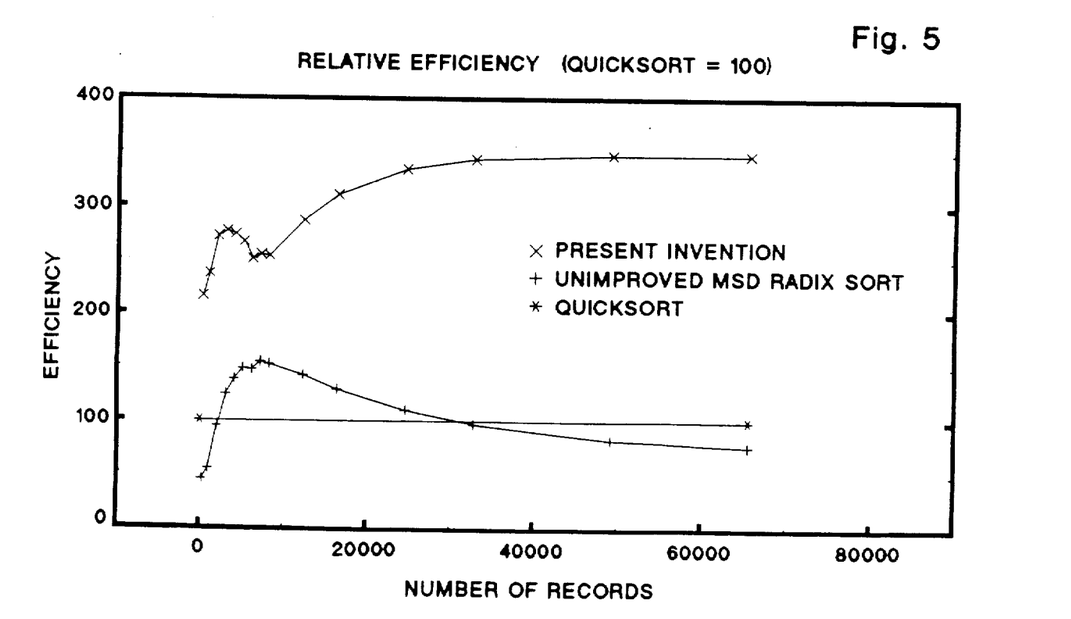
FIG. 5 is a graphical representation of the number of records to be sorted versus sorting efficiency for Quicksort, the present invention, and an unimproved MSD listed radix sort, for a larger number of records.

The sorting procedure of the present invention was compared with Quicksort and an unimproved MSD listed radix sort as described above to determine the respective throughput execution times under comparable data input and computing conditions, as shown in FIGS. 4 and 5. The comparisons were executed using an IBM Personal Computer, model no. 5150, serial no. 02000384 with an Intel 8088 microprocessor, a clock rate of 4.77 MHz and a PC-DOS 2.1 operating system. Tests were performed with data record size up to about 64,000 records. Limitations on memory space precluded conducting comparisons on larger files.

Both Quicksort and the present invention are sorting methods which utilize small work tables separate from the date file to temporarily store pointers or key values during the procedure. Such tables use minor amounts of memory relative to the sort records. Quicksort stacks the beginning and end of each unfinished partition, requiring an amount of storage related to log N. The present invention stores a beginning and end for each bin, an amount of storage related to the radix used. If, for example, instead of using an eight bit byte as the sort character we used a four bit nibble, the work tables would need only 16 components instead of 256. Thus, the present invention may be advantageously practiced with very restrictive memory requirements.

The Quicksort algorithm used in the comparisons is an improved version and is discussed in Robert Sedgewick's article *Implementing Quicksort Programs*, Communications of the ACM, October 1978, Vol. 21, No. 10. The exact time to sort the random records depends on the type of computer used, language and coding techniques; therefore, FIGS. 4 and 5 are intended for comparison purposes. The present invention, Quicksort, and the unimproved MSD listed radix sort of FIGS. 4 and 5 were coded in Pascal for the present comparison.

FIG. 4 shows the sort time of a preferred embodiment of the invention as applied to an MSD listed radix sort compared to the sort times for an unimproved MSD listed radix sort and Quicksort, as enhanced per Sedgewick, which is generally regarded as the most efficient all purpose sort. The purpose of FIG. 4 is to show that the present invention is significantly faster and more efficient than Quicksort, even for under 1,000 records, where radix sorting is generally very inefficient. Due to memory limitations, Quicksort could not be used to sort over approximately 8,000 records in the present comparison.

FIG. 5 shows the relative efficiency of the present invention compared to Quicksort, as enhanced per Sedgewick, and an unimproved MSD listed radix sort. The efficiency is the amount of time per record spent sorting. In FIG. 5, Quicksort is considered 100% efficient for any number of records. The unimproved MSD listed radix sort is somewhat less efficient than Quicksort for more than approximately 20,000 records, and very significantly less efficient for less than approximately 2,000 records. The present invention is clearly more efficient for any number of records, and is at least three to four times more efficient for more than 2,000 records. The "extra efficient" bump in the line for the present invention for N between 1,000 and 8,000 records disappears as three key characters become necessary to order the records.

The data used for the comparisons in FIGS. 4 and 5 was chosen without any equality in adjacent keys so as to preclude the use of the first process of the invention. Although this first process was not used, time to perform the tests and operations of the first process did exist and is included in the sort time.

The time saved through the use of the first process varies substantially with the data encountered as well as the language and type of computer used. Practice has shown that a record-pass through a group of equal characters is typically 50% to 150% faster with the first process. Such equal characters may be common in sorting names, i.e. Mr. Jones, Mr. Smith, etc.

FIG. 6 is one implementation of the flowchart of FIG. 1. FIG. 6 is a computer program written in "C", generally considered a popular and very practical computer language, where the two distinct processes of the present invention are separately labeled "#1" and "#2".

Figure 7:
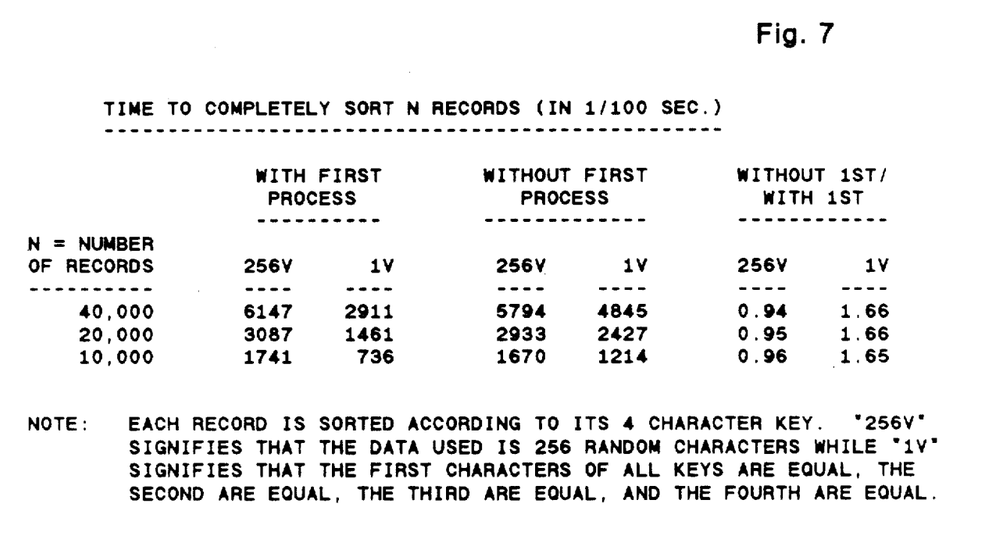
FIG. 7 is a table of actual sorting times.

FIG. 7 sets forth the actual time to sort 10,000, 20,000 and 40,000 records, with the first process and without the first process. Two sets of data were tested, each key being 4 characters long. In the "256V" columns of FIG. 7, 56 different random characters were used; while in the "1V" columns, the first characters of each key are equal, the second characters of each key are equal, the third characters of each key are equal and the fourth characters of each key are equal. There is no difference in timings if any of the first, second, third or fourth characters of an individual key are equal to each other. As can be seen from the last two columns of FIG. 7, utilizing the first process of the invention increases the time to sort random keys by approximately 5%, but saves approximately 66% of the sort time when the keys are equal. The first process of the invention was implemented in Pascal to arrive at the values in FIG. 7, however, the advantage of using the first process is even more pronounced when the invention is implemented in assembler language, where time savings have been determined to be 50 to 150%. Although the second process of the invention was not used, time to perform the tests and operations of the second process did exist and is included in the sort time.

The purpose and effect of the present invention as compared with a standard MSD listed radix sort is to make the sort reliably fast. Since certain tests or operations of the two processes take time, an MSD listed radix sort without these tests and operations will be faster under some conditions. Use of the invention slows down sorting a file of 32,768 perfectly random records with distinct key values between 0 and 32,767 by about 5% to 10%. This slowdown exists since the two processes are never used, although time to perform the tests and operations still exists. In effect, the present invention compromises some efficiency from the best case for an MSD listed radix sort, to avoid the worse cases. A threshold level of 24 for the present invention was used for the comparisons in FIGS. 4 and 5. A threshold level of 36 was found more efficient except in the instance where the original data is reverse-sequenced. The threshold level is a fraction of the number of possible different characters, and determines whether it is most efficient for the system to utilize the second improvement. It is a function of the software and hardware used, and the number of different possible characters. By decreasing the threshold level, the reverse-sequence case can be made faster than the average case. In such a case, the gain from the equal characters more than offsets the slow "bins-in-use" table sort.

It should be noted that the characters of the key, namely, A, B, C, etc. as well as the representation of each character by a unique byte of eight bits yielding 256 different possible characters are merely chosen as a convenient representation of the present invention and are not intended to be in any way limiting on the sorting procedure (i.e., the "sort character" could have any number of bits, if sufficient bin space was available). By using only the letters A through Z, a maximum of 6 bins will be established, while use of all combinations of an 8 bit byte will yield 256 different bins. The present invention can sort keys into any desired sequence. The internal representation of numbers or other unusual lexicographic sequences can be treated by the present invention as applied to bin sorting procedures more efficiently than comparison sorts such as Quicksort because the key values need only be converted essentially once and not many ($\log_2 N$) times as in comparison sorts. Unusual orderings can be performed by either (a) using a special order to relink the bins during the reassembly procedure, or (b) converting each sort character as it is picked up from each record's key.

The present invention has been described as most useful for internal use on general use electronic computers, but is also well suited for use in a variety of applications such as external computer sorts or sorting on special purpose machines In addition, some elements of the present invention are treated as constants in the description for clarity, but could be varied to suit a particular implementation. For example, the range of bins used in a file or group of records can be kept track of and the threshold level which determines whether all potential bins will be checked during reassembly, adjusted accordingly.

The present invention is not limited to an MSD listed radix sort as set forth in the preferred embodiment of the invention, but may be advantageously applied to essentially any type of bin sort such as an LSD listed radix sort, or distribution counting sort (MSD and LSD). The present invention may be practiced by moving the records themselves and not the pointers. The present invention may be applied in a hybrid sort, where other sorting algorithms such as an insertion sort can be used on relatively small sub-groups instead of sorting down to singletons, and/or an LSD sort could be used on large files with short keys. As depicted in FIG. 6, the record structure uses a full character to indicate "end-of-group". Only one bit is needed for that purpose, therefore, in some applications, that one bit may be combined with pointers, or other information could be stored in that character. If record counts are developed, for example, they may be kept in a beginning-of-group character. Another alternative is to look for a change in a more significant key character to determine the end-of-group. The sorting process has been described as continuing until all N records are completely sorted, however, this may not necessarily be the case. For example, if we wish to determine the ten highest paid people from a list of N, where the key is the salary, a single record-pass on the MSD may suffice.

The present invention has been presented in terms of various examples and related procedures, and the major areas of possible application have been discussed. The scope of the claims contemplates a broad range of application of the invention. It will be clear to those skilled in the art that the examples set forth are merely illustrative of the almost endless applications of the present invention some of which will become apparent in the future as new areas related to sorting develop, and that the invention is intended to be limited only in accordance with the claims.

What is claimed:

1. In a bin sorting method for computing equipment in which a group of keys are sorted by association with bins, wherein a key consists of the values which govern the sorting process, the steps comprising:
    (a) testing by computer comparison for equality between a portion of a key and a corresponding portion of a prior adjacent key;
    (b) if said portions are not equal,
        i. determining the location of a bin corresponding to said portion of said key, and
        ii. associating said key with said corresponding bin thereby ordering said key, and
    (c) if said portions are equal, omitting steps (b) i. and (b) ii. and permitting said key to remain adjacent to said prior adjacent key.

2. In a bit sorting method for computing equipment wherein keys each formed by a plurality of characters are ordered by successive iterations of processing into any of a number of bins M, the step comprising:
    identifying in an auxiliary table all of the different characters of a sub-group of keys encountered during a current iteration through such sub-group, and
    if the number of said characters identified in said auxiliary table is not greater than a threshold level at the end of said current iteration, processing in a predetermined order only those bins corresponding to characters identified in said auxiliary table, and
    if the number of said characters identified in said auxiliary table is greater that said threshold level at the end of the current iteration, checking all bins to determine which ones have been used, and processing only those bins actually used.

3. The method of claim 2, characterized in that said threshold level is between approximately three percent and approximately twenty-five percent of said M total of bins.

4. In a bin sorting method for computing equipment by sorting a group of records comprised of a group of identifying keys and related data into desired sequence, the steps comprising:
    i. fetching and evaluating a portion of a key, said portion having one of M possible distinct values,
    ii. determining whether said portion of a key has been previously encountered in a present iteration of said sorting procedure,
    iii. appending said key to a bin identified by said one of M possible distinct values,
    iv. repeating (i), (ii) and (iii) until each key in at least a sub-group of keys has been evaluated and appended to a bin,
    v. selecting, in a predetermined order, a first bin with a sub-group of appended keys as a new beginning portion of a file, wherein said selecting includes a process of determining which bins have at least one appended key and which bins do not,
    vi. selecting, in said predetermined order a next bin with a next sub-group of appended keys, and appending said next sub-group of appended keys onto said file, wherein said selecting includes a process of determining which bins have at least one appended key and which bins do not,
    vii. repeating step (vi) through (vii) until all of said bins have been tested, and all of said keys have been appended to said file, and
    viii. performing steps (i) through (vii) until all keys are sorted, wherein the improved method comprises the steps:
        (a) after an unsorted key is fetched and prior to determining whether said portion of a key has been previously encountered in a present iteration of said sorting procedure, performing an additional step of determining whether said portion of a key is equal to a second portion of a key in the same respective position of an adjacent key, and
        (b) if said portion of a key is equal to said second portion of a key, failing to perform steps (ii) and (iii) and proceeding to step (iv).

5. The process of claim 4 characterized in that said adjacent key is the prior key.

6. The process of claim 4 characterized in that said adjacent key is the subsequent key.

7. In a bin sorting procedure for computing equipment by sorting a group of records comprised of a group of identifying keys and related data into a desired sequence, the steps comprising:
    i. fetching and evaluating a portion of a key, said portion having one of M possible distinct values,
    ii. determining whether said portion of a key has been previously encountered in a present iteration of said sorting procedure,
    iii. appending said key to a bin identified by said one of M possible distinct values,
    iv. repeating steps (i), (ii) and (iii) until each key in at least a sub-group of keys has been evaluated and appended to a bin,
    v. selecting, in a predetermined order, a first bin with a sub-group of appended keys, and treating said sub-groups of appended keys as a new beginning portion of a file, wherein said selecting includes a process of determining which bins have at least one appended key and which bins do not,
    vi. selecting, in said predetermined order, a next bin with a next sub-group of appended keys, and appending said next sub-group of appended keys onto said file, wherein said selecting includes a process of determining which bins have at least one appended key and which bins do not, vii. repeating step (vi) until all of said bins have been tested, and all of said keys have been appended to said file, and viii. performing steps (i) through (vii) until all keys are sorted, wherein the improved method comprises the steps:

(a) performing an additional step of utilizing an auxiliary table to identify each said M possible distinct values actually encountered during a current iteration through said sub-group of keys, and (b) if said number of values actually encountered is not greater than a threshold level at the end of said current iteration, processing in a predetermined order only those bins identified by said auxiliary table, and failing to determine which bins have at least one appended key and which bins do not.

8. The process of claim 7 characterized in that said threshold level is between approximately three percent and approximately twenty-five percent of said M possible distinct values.

9. Apparatus for sorting a group of keys by association with bins, comprising:

testing means for determining whether a portion of a key is equal to a corresponding portion of a prior adjacent key;

first ordering means for determining the location of a bin corresponding to said portion of said key and associating said key with said corresponding bin if said portions are not equal; and second ordering means for permitting said key to remain adjacent to said prior adjacent key if said portions are equal.

10. Apparatus for sorting a group of keys wherein each of said keys are formed by a plurality of characters and are ordered by successive iterations of processing into any of a number of bins M, comprising:

means for defining a said number of bins M, identifying means responsive to said iterations for identifying all of the difference characters of a sub-group of keys encounter during a current iteration through such sub-group, and counting means for determining whether said identified different characters exceeds a threshold level, processing means responsive to a determination by said counting means that said identified different characters does not exceed said threshold level, for processing in a predetermined order only those bins corresponding to said identified different characters, and checking means responsive to a determination by said counting means that said identified different characters exceeds said threshold level, for checking all bins to determine which ones have been used, and processing only those bins actually used.

11. The apparatus of claim 10, characterized in that said threshold level is between approximately three percent and approximately twenty-five percent of said M total of bins.

12. Apparatus for sorting a group of records comprised of a group identifying keys and related data into a desired sequence, comprising:

i. means for fetching sand evaluating a portion of a key, said portion having one of M possible distinct values, ii. means for determining whether said portion of a key has been previously encountered in a present iteration of said sorting procedure, iii. identifying means for appending said key to a bin identified by said one of M possible distinct values, iv. distributing means for repeating steps (i), (ii) and (iii) until each key in at least a sub-group of keys has been evaluated and appended to a bin, v. first selecting means responsive to said distributing means, for choosing, in a predetermined order, a first bin with a sub-group of appended keys, and treating said sub-group of appended keys as a new beginning portion of a file, wherein said selecting includes a process of determining which bins have at least one appended key and which bins do not, vi. next selecting means responsive to said distributing means, for choosing, in said predetermined order, a next bin with a next sub-group of appended keys, and appending said next sub-group of appended keys onto said file, wherein said selecting includes a process of determining which bins have at least one appended key and which bins do not, vii. means for repeating step (vi) until all of said bins have been tested, and all of said keys have been appended to said file, and viii. means for performing steps (i) through (vii) until all keys are sorted, wherein the improved apparatus comprises:

(a) testing means responsive to said means for fetching and evaluating, for performing an additional step of determining whether said portion of a key is equal to a second portion of a key in the same respective position of an adjacent key, and (b) skipping means responsive to a determination by said testing means that said portion of a key is equal to said second portion of an adjacent key, for skipping over steps (ii) and (iii) and proceeding to step (iv).

13. The apparatus of claim 12 characterized in that said adjacent key is the prior key.

14. The apparatus of claim 12 characterized in that said adjacent key is the subsequent key.

15. Apparatus for sorting a group of records comprised of a group of identifying keys and related data into a desired sequence, comprising:

i. means for fetching and evaluating a portion of a key, said portion having one of M possible distinct values, ii. means for determining whether said portion of a key has been previously encountered in a present iteration of said sorting procedure, iii. identifying means for appending said key to a bin identified by said one of M possible distinct values, iv. distributing means for repeating steps (i), (ii) and (iii) until each key in at least a sub-group of keys has been evaluated and appended to a bin, v. first selecting means responsive to said distributing means for choosing, in a predetermined order, a first bin with a sub-group of appended keys, and treating said sub-group of appended keys as new beginning portion of a file, wherein said selecting includes a process of determining which bins have at least one appended key and which bins do not, vi. next selecting means responsive to said distributing means, for choosing, in said predetermined order, a next bin with a next sub-group of appended keys, and appending said next sub-group of appended keys onto said file, wherein said selecting includes a process of determining which bins have at least one appended key and which bins do not, vii. means for repeating step (vi) until all of said bins have been tested, and all of said keys have been appended to said file, and viii. means for performing steps (i) through (vii) until all keys are sorted, wherein the improved apparatus comprises:

(a) auxiliary identifying means for performing an additional step of identifying, in an auxiliary table, each of said M possible distinct values actually encountered during a current iteration through said sub-group of keys, (b) counting means for determining whether the number of said M values actually encountered exceeds a thresholds level, (c) processing means responsive to a determination by said counting means that said number of M values actually threshold level, for processing in a predetermined order only those bins identified by said auxiliary table, and failing to determine which bins are associated with at least one key and which bins are not.

16. The apparatus of claim 15 characterized in that said threshold level is between approximately three percent and approximately twenty-five percent of said M possible distinct values.

* * * * *